(12) United States Patent
Saito

(10) Patent No.: US 11,162,881 B2
(45) Date of Patent: Nov. 2, 2021

(54) TEST APPARATUS

(71) Applicant: DISCO CORPORATION, Tokyo (JP)

(72) Inventor: Yoshinobu Saito, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 212 days.

(21) Appl. No.: 16/707,526

(22) Filed: Dec. 9, 2019

(65) Prior Publication Data

US 2020/0182759 A1   Jun. 11, 2020

(30) Foreign Application Priority Data

Dec. 10, 2018   (JP) .............................. JP2018-231041

(51) Int. Cl.
*G01N 3/20*   (2006.01)
*G01N 3/08*   (2006.01)

(52) U.S. Cl.
CPC ................. *G01N 3/08* (2013.01); *G01N 3/20* (2013.01); *G01N 2203/0282* (2013.01); *G01N 2203/04* (2013.01); *G01N 2203/0423* (2013.01); *G01N 2203/0676* (2013.01)

(58) Field of Classification Search
CPC ............. G01N 3/08; G01N 3/20; G01N 3/024
See application file for complete search history.

(56) References Cited

U.S. PATENT DOCUMENTS

| | | | |
|---|---|---|---|
| 8,931,349 B2 * | 1/2015 | Schwenke ................ | G01N 3/08 73/788 |
| 2012/0227508 A1 * | 9/2012 | Schwenke ................ | G01N 3/08 73/788 |

FOREIGN PATENT DOCUMENTS

| | | | |
|---|---|---|---|
| CN | 109253913 B | * | 11/2020 |
| CN | 111929154 A | * | 11/2020 |
| JP | 09229838 A | | 9/1997 |

* cited by examiner

*Primary Examiner* — Jonathan M Dunlap
(74) *Attorney, Agent, or Firm* — Greer Burns & Crain Ltd.

(57) ABSTRACT

A test apparatus for measuring strength of a specimen includes: a lower container having an opening that opens upward; an upper container having an opening that opens downward and being sized to be insertable into the opening of the lower container; a support unit that is provided in the opening of the lower container and supports the specimen; a pressing unit including an indenter that presses the specimen, and a load measurement unit that measures a load applied to the indenter; and a movement mechanism that moves the indenter closer and away relative to the support unit, in which when the specimen supported by the support unit is pressed by the indenter moved by the movement mechanism, the upper container is positioned so as to cover the specimen.

4 Claims, 6 Drawing Sheets

TEST APPARATUS

BACKGROUND OF THE INVENTION

Field of the Invention

The present invention relates to a test apparatus for measuring the strength of a specimen.

Description of the Related Art

A plurality of devices such as an integrated circuit (IC) or large-scale integration (LSI) is formed on a semiconductor wafer. Dividing the semiconductor wafer produces a plurality of device chips each including one of these devices. The device chips are built in various electronic equipment typified by mobile phones and personal computers.

A cutting apparatus is used to divide a semiconductor wafer. The cutting apparatus includes a chuck table and a cutting unit, for example. The chuck table holds the semiconductor wafer. The cutting unit includes an annular cutting blade mounted thereon. The cutting blade is used to cut the semiconductor wafer. By rotating the cutting blade and causing the cutting blade to cut into the semiconductor wafer, the semiconductor wafer is cut and divided into a plurality of device chips. In recent years, electronic equipment has become smaller and thinner. This creates a need for thinner device chips. To meet the need, there is a method available that grinds and thins the semiconductor wafer before division. The semiconductor wafer is ground using a grinding apparatus. The grinding apparatus includes a chuck table and a grinding unit, for example. The chuck table holds the semiconductor wafer. The grinding unit includes a grinding wheel mounted thereon. The grinding wheel includes a grinding stone for grinding the semiconductor wafer.

When the semiconductor wafer is processed using the above-described cutting apparatus or grinding apparatus, processing strain (such as cutting strain or grinding strain) may be formed in the semiconductor wafer. If this processing strain remains in a device chip obtained by dividing the semiconductor wafer, it is likely that the strength of the device chip decreases and the device chip is damaged. Therefore, the processing conditions of the semiconductor wafer are set so as to maintain the strength of the device chip above a certain level.

The strength of the device chip is measured by a three-point bending test using the device chip as a specimen, for example. The three-point bending test measures the strength of the specimen by pressing an indenter against a central portion of the specimen with both ends of the specimen supported and monitoring the load applied to the indenter pressing the specimen. For example, Japanese Patent Laid-Open No. Hei 9-229838 discloses a test apparatus (measuring apparatus) for measuring the strength (bending strength) of the specimen by performing the three-point bending test.

SUMMARY OF THE INVENTION

When the test apparatus measures the strength of the specimen, the test apparatus presses the indenter against the specimen until the specimen is broken and detects the maximum value of the load applied to the indenter, for example. When the specimen is broken, fragments of the specimen are scattered. Therefore, the operator who operates the test apparatus wears a protector such as goggles during the test. However, wearing the protector narrows the field of view of the operator and reduces the visibility of the specimen and the components (such as the indenter) of the test apparatus. The reduced visibility makes it difficult to test the strength of the specimen.

The present invention has been made in view of the above-described issue. It is an object of the present invention to provide a test apparatus capable of facilitating a strength test of a specimen.

In accordance with an aspect of the present invention, there is provided a test apparatus for measuring strength of a specimen. The test apparatus includes: a lower container having an opening that opens upward; an upper container having an opening that opens downward and being sized to be insertable into the opening of the lower container; a support unit that is provided in the opening of the lower container and supports the specimen; a pressing unit including an indenter that presses the specimen, and a load measurement unit that measures a load applied to the indenter; and a movement mechanism that moves the indenter closer and away relative to the support unit, in which when the specimen supported by the support unit is pressed by the indenter moved by the movement mechanism, the upper container is positioned so as to cover the specimen.

Preferably, the test apparatus further includes: a fragment discharge path having one end that is coupled to a fragment discharge port formed at a bottom of the lower container and having another end that is coupled to a suction source; and a fragment collector that is provided in the fragment discharge path and collects a fragment of the specimen. Preferably, moreover, the test apparatus further includes a nozzle that blows air toward the indenter. Preferably, moreover, the support unit includes a pair of support portions that is spaced apart from each other and supports a lower surface side of the specimen, and a pair of contact members each provided on either side of the pair of support portions and each having a contact surface that contacts and supports the specimen, each of the pair of contact members is provided such that the contact surface is positioned higher than upper ends of the pair of support portions, the indenter is positioned above the pair of support portions so as to overlap with a region between the pair of support portions, and when the specimen is pressed by the indenter, the specimen is supported by the pair of support portions.

In the test apparatus according to the described aspect of the present invention, when the specimen supported by the support unit is pressed by the indenter, the upper container is positioned so as to cover the specimen. Therefore, the upper container positioned in this manner prevents fragments of the specimen from scattering outside the test apparatus when the specimen is pressed and broken by the indenter. As described above, since the upper container prevents the fragments of the specimen from scattering outside the test apparatus, the operator of the test apparatus does not need to wear a protector such as goggles when testing the strength of the specimen. This, in turn, prevents a reduction in visibility of the specimen and the components (such as the indenter) of the test apparatus due to wearing of the protector, and facilitates the strength test of the specimen.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
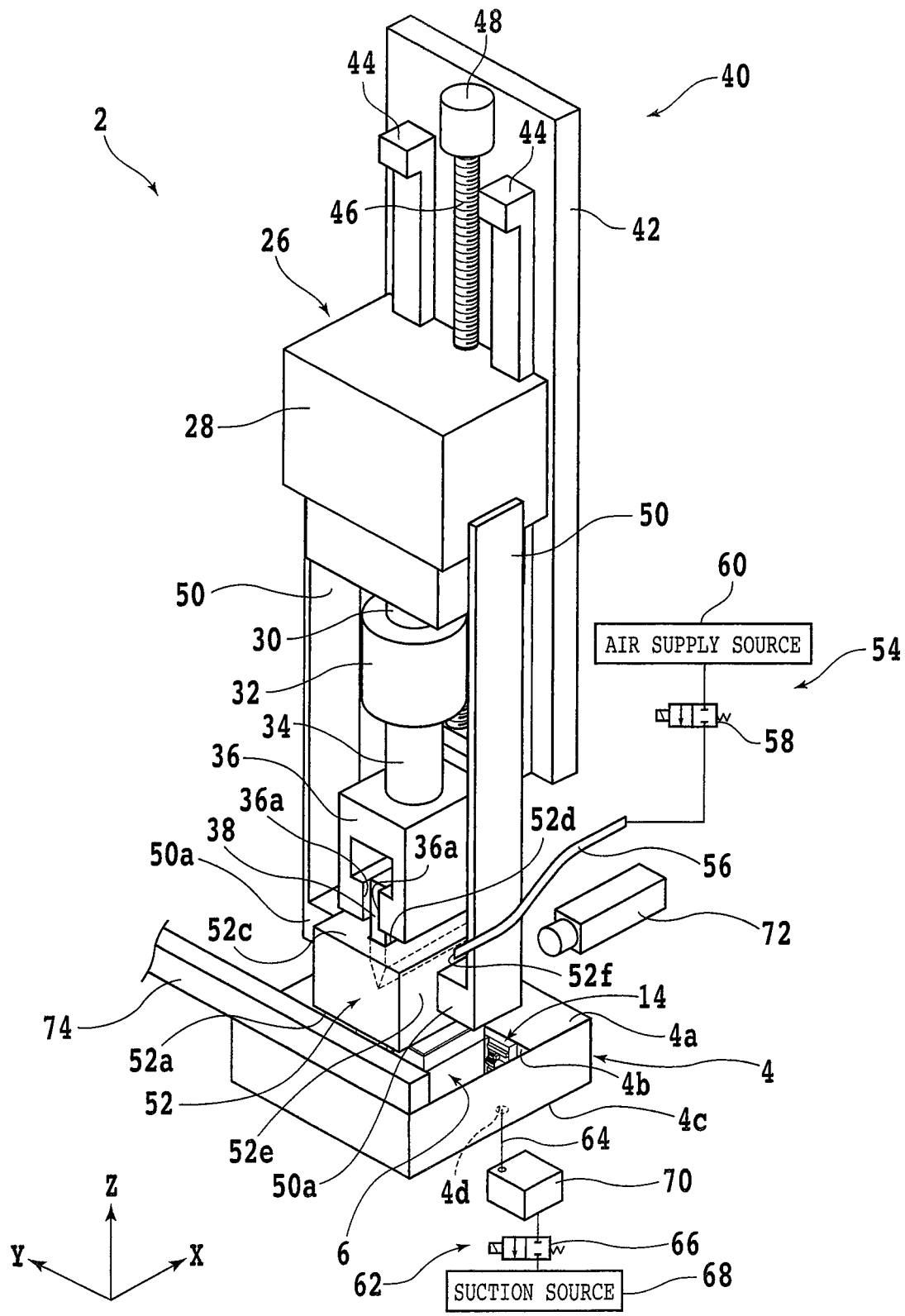
FIG. 1 is a perspective view of a test apparatus.

An embodiment according to an aspect of the present invention will be described below with reference to the accompanying drawings. First, an example of a configuration of a test apparatus according to the present embodiment will be described. FIG. 1 is a perspective view of a test apparatus 2 for testing the strength of a specimen (test piece).

The test apparatus 2 measures the bending strength (flexural strength) of the specimen such as a device chip. A silicon wafer has regions that are each defined by a plurality of division planned lines (streets) intersecting each other. Each region includes a device such as an IC or LSI. Dividing the silicon wafer along the plurality of division planned lines produces device chips, for example.

There is no limitation to, for example, the type, the material, the shape, the structure, and the size of the specimen whose strength is measured by the test apparatus 2. For example, the specimen may be a test chip obtained by dividing a wafer having a front side on which no device is formed and a back side ground or polished under a predetermined condition. The result of measuring the strength of the chip using the test apparatus 2 can be used to select the processing conditions of the semiconductor wafer, for example. The specimen may also be a chip or the like obtained by dividing a substrate made of a semiconductor (SiC, GaAs, InP, GaN, or the like) other than silicon, or another material such as sapphire, glass, ceramics, resin, or metal.

The test apparatus 2 includes a box-like lower container (container) 4 having a rectangular parallelepiped shape. The lower container 4 has an opening 4b having a rectangular parallelepiped shape. The opening 4b is formed on an upper surface 4a side of the lower container 4 and opens upward. A support unit (support means) 6 is provided inside the opening 4b. The support unit 6 supports the specimen whose strength is measured by the test apparatus 2.

Figure 2:
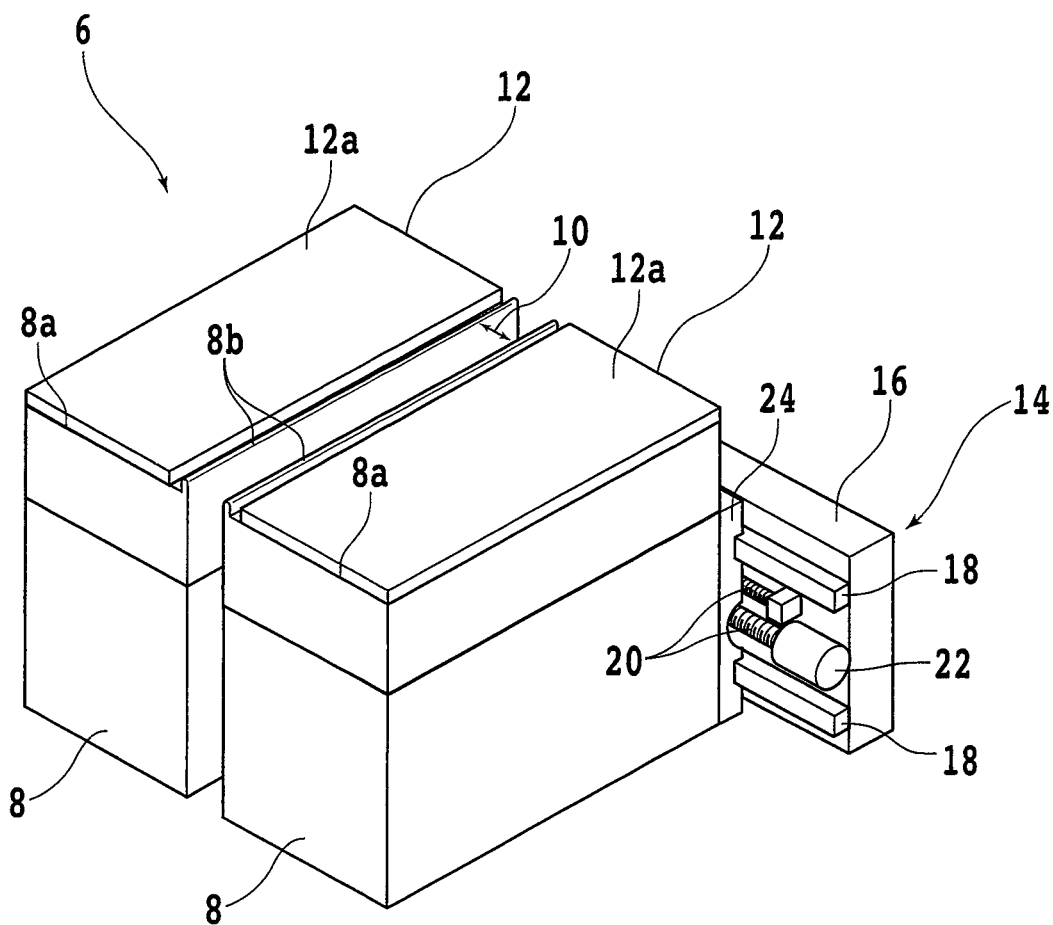
FIG. 2 is a perspective view of a support unit.

FIG. 2 is a perspective view of the support unit 6. The support unit 6 includes a pair of support bases 8, which supports the specimen. The pair of support bases 8 has a rectangular parallelepiped shape and is spaced apart from each other so as to provide a gap 10 between the pair of support bases 8. Each of the pair of support bases 8 has an upper surface 8a and is provided such that a longitudinal direction of the upper surface 8a is parallel to a first horizontal direction (X-axis direction, front-rear direction). The specimen whose strength is measured is placed on the pair of support bases 8.

A columnar (bar-shaped) support portion 8b is formed on each of the upper surfaces 8a of the pair of support bases 8. Specifically, each support portion 8b protrudes upward from a corresponding one of the upper surfaces 8a. Each support portion 8b is made of metal such as, for example, a stainless steel material. Each support portion 8b is provided adjacent to the gap 10 such that a longitudinal direction of each support portion 8b is parallel to the X-axis direction. The pair of support portions 8b is spaced apart from each other with the gap 10 interposed therebetween, and supports a lower surface side of the specimen. With reference to FIG. 2, each support portion 8b has a curved upper surface.

A plate-like contact member 12 is formed on each of the upper surfaces 8a of the pair of support bases 8 and is made of a material (such as a rubber sponge) that is more flexible than the support portion 8b. The pair of contact members 12 has a rectangular shape in plan view and is each provided on either side of the pair of support portions 8b. Specifically, each contact member 12 is provided on the side, which is opposite to the gap 10, of a corresponding one of the pair of support portions 8b, and the pair of support portions 8b is provided between the pair of contact members 12. Upper surfaces of the pair of contact members 12 constitute respective contact surfaces 12a. The contact surfaces 12a contact and support the specimen. Each contact member 12 is provided such that the corresponding contact surface 12a thereof is positioned higher than upper ends of the pair of support portions 8b (approximately 1 mm higher than the upper ends of the pair of support portions 8b, for example). Therefore, when the specimen is placed on the pair of support bases 8, the lower surface side of the specimen does not contact the pair of support portions 8b but contacts the contact surfaces 12a of the pair of contact members 12. Details of the contact of the pair of support portions 8b and the pair of contact members 12 with the specimen will be described later (see FIGS. 4 to 6).

A support-base movement mechanism (support-base movement means) 14 is provided on a rear side of the pair of support bases 8. The support-base movement mechanism 14 moves each of the pair of support bases 8 in a second horizontal direction (Y-axis direction, left-right direction) perpendicular to the first horizontal direction. The support-base movement mechanism 14 includes a support structure 16 having a rectangular parallelepiped shape. A pair of guide rails 18 is fixed to a front surface side (front side) of the support structure 16 in the Y-axis direction with a predetermined gap interposed between the pair of guide rails 18. A pair of ball screws 20 is provided between the pair of guide rails 18 and is substantially parallel to the pair of guide rails 18. A pulse motor 22 is coupled to one end of each of the pair of ball screws 20 and rotates the corresponding one of the pair of ball screws 20.

The support-base movement mechanism 14 includes a pair of movement plates 24. Each movement plate 24 is fixed to a rear surface side of a corresponding one of the pair of support bases 8. Each movement plate 24 is slidably mounted on the pair of guide rails 18 provided on the front surface side of the support structure 16. A nut portion, not illustrated, is provided on a rear surface side (back side) of each of the pair of movement plates 24. The nut portion provided in one of the pair of movement plates 24 is screwed into one of the pair of ball screws 20, while the nut portion provided in the other one of the pair of movement plates 24 is screwed into the other one of the pair of ball screws 20. When the pair of ball screws 20 is rotated by the respective pulse motors 22, the pair of movement plates 24 screwed into the respective ball screws 20 moves along the pair of guide rails 18 in the Y-axis direction. In this manner, the position of each of the pair of support bases 8 in the Y-axis direction and the width of the gap 10 are controlled.

There is no limitation to, for example, the shapes and the sizes of the lower container 4 and the opening 4b illustrated in FIG. 1. The shapes and the sizes of the lower container 4 and the opening 4b are changed as appropriate according to the shapes and the sizes of the support unit 6 and the support-base movement mechanism 14.

A pressing unit 26 is provided above the lower container 4. The pressing unit 26 presses the specimen supported by the support unit 6 and measures the load applied to the pressing unit 26 at the time of pressing the specimen.

Figure 3:
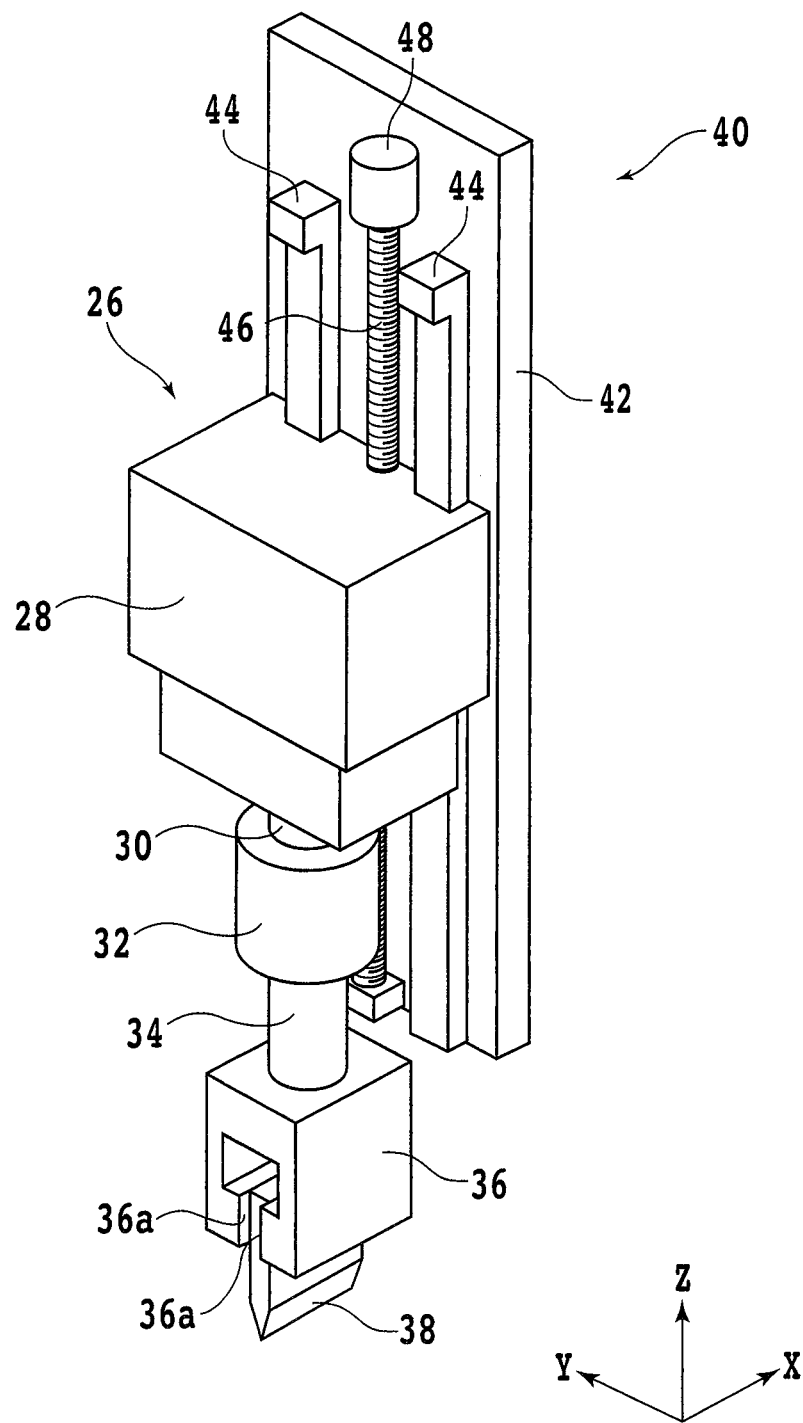
FIG. 3 is a perspective view of a pressing unit.

FIG. 3 is a perspective view of the pressing unit 26. The pressing unit 26 includes a movement base 28 coupled to a movement mechanism (movement means) 40. A cylindrical first support member 30 is coupled to a lower surface of the movement base 28 and extends downward from the lower surface of the movement base 28. A load measurement unit (load measurement means) 32 is fixed to a lower end side of the first support member 30. The load measurement unit 32 includes a load cell and the like. A holding member 36 is coupled to a lower side of the load measurement unit 32 with a cylindrical second support member 34 interposed between the holding member 36 and the load measurement unit 32. The holding member 36 has a substantially gate shape in front view, and has a pair of holding surfaces 36a facing each other. An indenter 38 is fixed between the pair of holding surfaces 36a and presses the specimen supported by the support unit 6.

A tip portion (lower end portion) of the indenter 38 has a tapered shape with the width thereof decreasing downward. Specifically, both side surfaces of the tip portion of the indenter 38 are inclined relative to a vertical direction (Z-axis direction, top-bottom direction). Although the tip (lower end) of the indenter 38 has a rounded shape (R shape) (see FIG. 4), the shape of the indenter 38 is not limited to the rounded shape. The indenter 38 is supported by the holding member 36 such that the lower end of the indenter 38 is parallel to the X-axis direction. In other words, the lower end of the indenter 38 and the pair of support portions 8b (see FIG. 2) included in the support unit 6 are substantially parallel to each other.

The movement mechanism 40 is provided on a rear side (back side) of the pressing unit 26. The movement mechanism 40 moves the pressing unit 26 in the vertical direction. The movement mechanism 40 includes a support structure 42 having a rectangular parallelepiped shape. A pair of guide rails 44 is fixed to a front surface side (front side) of the support structure 42 in the Z-axis direction with a predetermined gap interposed between the pair of guide rails 44. A ball screw 46 is provided between the pair of guide rails 44 and is substantially parallel to the pair of guide rails 44. A pulse motor 48 is coupled to one end of the ball screw 46 and rotates the ball screw 46.

A rear surface side (back side) of the movement base 28 of the pressing unit 26 is slidably mounted on the pair of guide rails 44. A nut portion, not illustrated, is provided on the rear surface side of the movement base 28 and is screwed into the ball screw 46. When the ball screw 46 is rotated by the pulse motor 48, the movement base 28 moves in the Z-axis direction along the pair of guide rails 44. In this manner, the position of the pressing unit 26 in the Z-axis direction is controlled. As the movement mechanism 40 moves the pressing unit 26 in the Z-axis direction, the indenter 38 moves closer or away relative to the support unit 6.

As illustrated in FIG. 1, a pair of coupling members 50 having a plate shape is each fixed to either side surface of the movement base 28. Specifically, each coupling member 50 extends downward from a corresponding one of the side surfaces of the movement base 28. A lower end of each coupling member 50 is positioned lower than a lower end of the holding member 36. A pair of upper-container support portions 50a is each formed at a corresponding one of lower end portions of the pair of coupling members 50 and protrudes toward the indenter 38. An upper container (cover) 52 having a rectangular parallelepiped shape is fixed between the pair of upper-container support portions 50a and covers the tip portion of the indenter 38. The upper container 52 is provided above the lower container 4. Both side surfaces of the upper container 52 are supported by the pair of upper-container support portions 50a.

The upper container 52 has a box shape and is made of a transparent material (glass, plastic, or the like), for example. The upper container 52 has an opening 52b having a rectangular parallelepiped shape (see FIG. 4). The opening 52b is formed on a lower surface 52a side of the upper container 52 and opens downward. An indenter insertion hole 52d is formed on an upper surface 52c side of the upper container 52, and the tip portion of the indenter 38 is inserted into the indenter insertion hole 52d. Therefore, the tip portion of the indenter 38 is covered by the upper container 52. With reference to FIG. 1, a broken line represents a part of the indenter 38 that is covered by the upper container 52. The upper container 52 is sized to be insertable into the opening 4b of the lower container 4 and is positioned inside the opening 4b of the lower container 4 in plan view. The opening 52b (see FIG. 4) of the upper container 52 is sized to accommodate the support unit 6. Therefore, when the pressing unit 26 is moved downward by the movement mechanism 40, the upper container 52 is inserted into the opening 4b of the lower container 4 and covers an upper side of the support unit 6.

A nozzle insertion hole 52f is provided in a side wall 52e of the upper container 52. An air supply unit 54 is coupled to the nozzle insertion hole 52f and blows air to the tip portion of the indenter 38. The air supply unit 54 includes a nozzle 56. The nozzle 56 blows air toward the indenter 38. One end of the nozzle 56 is inserted into the upper container 52 through the nozzle insertion hole 52f, while the other end of the nozzle 56 is coupled to an air supply source 60 through a valve 58. A tip 56a of the one end of the nozzle 56 opens toward a side surface of the tip portion of the indenter 38 (see FIG. 4). Blowing air from the air supply source 60 to the side surface of the tip portion of the indenter 38 through the valve 58 and the nozzle 56 removes foreign matter that adheres to, for example, the tip portion of the indenter 38, the pair of support portions 8b, and the contact surfaces 12a (see FIG. 2). Details of the operation of the air supply unit 54 will be described later.

A fragment discharge port 4d is formed at the bottom of the lower container 4. Specifically, the fragment discharge port 4d passes through a lower surface (bottom surface) 4c of the lower container 4 from the bottom of the opening 4b of the lower container 4. A fragment discharge unit 62 is coupled to the fragment discharge port 4d and discharges fragments of the specimen that are present inside the lower container 4. The fragment discharge unit 62 includes a fragment discharge path 64. The fragment discharge path 64 constitutes a path for discharging the fragments of the specimen. One end of the fragment discharge path 64 is coupled to the fragment discharge port 4d, while the other end of the fragment discharge path 64 is coupled to a suction source 68 through a valve 66. A fragment collector 70 is provided in the fragment discharge path 64 and collects the fragments of the specimen. The fragment collector 70 includes a filter, for example, and captures the fragments of the specimen passing through the fragment discharge path 64. When the valve 66 is opened, the fragments of the specimen scattered inside the opening 4b of the lower container 4 are sucked from the fragment discharge port 4d and collected by the fragment collector 70. Details of the operation of the fragment discharge unit 62 will be described later.

An imaging unit (camera) 72 is provided on a rear side of the lower container 4. A light source 74 is provided on a front side of the lower container 4 and emits light toward the imaging unit 72. The positions of the imaging unit 72 and the light source 74 are adjusted such that the imaging unit 72 can image, for example, the specimen supported by the support unit 6 and the tip portion of the indenter 38. While the light source 74 emits light, the imaging unit 72 images the tip portion of the indenter 38. Accordingly, the operator can observe the specimen being pressed by the indenter 38 and the state of the tip portion of the indenter 38 (the presence/absence of adhering foreign matter, chipping, or the like). When the imaging unit 72 performs the imaging in a sufficiently bright environment, the light source 74 may be omitted.

Each component included in the test apparatus 2 is coupled to a controller, not illustrated, that controls the operation of the test apparatus 2. For example, the operations of the support-base movement mechanism 14, the load measurement unit 32, the movement mechanism 40, the air supply unit 54, the fragment discharge unit 62, the imaging unit 72, the light source 74, and the like, are controlled by the controller.

Figure 4:
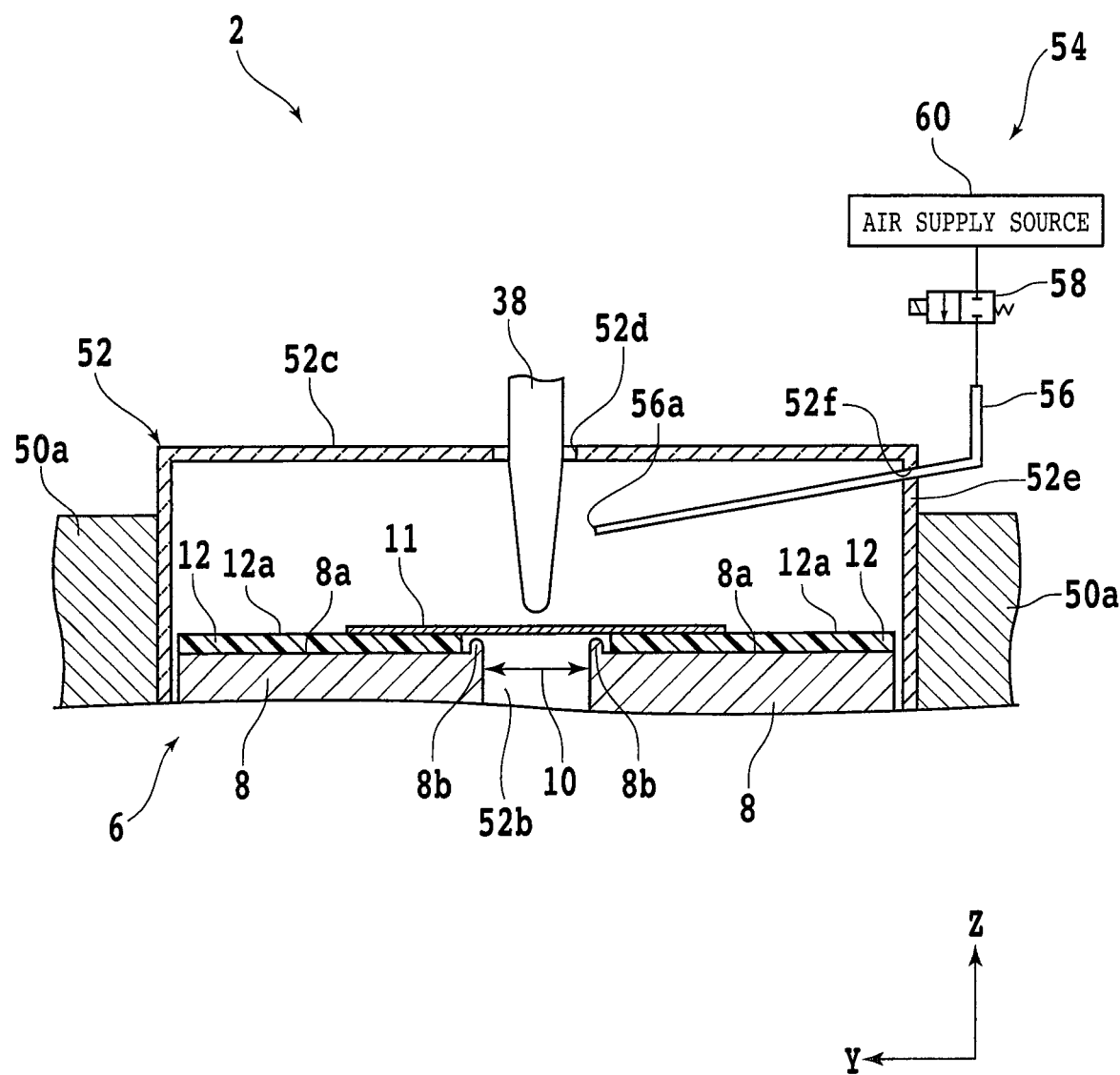
FIG. 4 is a cross-sectional view of the test apparatus with a specimen supported by the support unit.

A three-point bending test can be performed on the specimen using the test apparatus 2 described above. The three-point bending test is performed to measure the bending strength (flexural strength) of the specimen. Hereinafter, an example of the operation of the test apparatus 2 at the time of measurement of the strength of the specimen will be described. FIG. 4 is a cross-sectional view of the test apparatus 2 with a specimen (test piece) 11 supported by the support unit 6. As illustrated in FIG. 4, the indenter 38 is positioned above the pair of support portions 8b so as to overlap with the region (gap 10) between the pair of support portions 8b. The indenter 38 is provided such that the tip (lower end) of the indenter 38 is parallel to the longitudinal direction (X-axis direction) of the support portion 8b.

When the strength of the specimen 11 is measured, the support-base movement mechanism 14 (see FIG. 2) adjusts the positions of the pair of support bases 8 in the Y-axis direction. The positions of the pair of support bases 8 are adjusted such that the gap 10 has an appropriate width according to, for example, the dimensions of the specimen 11. After that, the specimen 11 is placed on the pair of support bases 8. Specifically, the specimen 11 is placed such that both end portions of the specimen 11 are supported by the pair of support bases 8 and a central portion thereof overlaps with the gap 10.

If the lower surface side of the specimen 11 contacts the pair of support portions 8b when the specimen 11 is placed on the pair of support bases 8, the lower surface side of the specimen 11 may be damaged due to an impact when the specimen 11 is placed. This damage may change the strength of the specimen 11 and make it difficult to measure the strength of a plurality of specimens 11 under the same conditions. In the present embodiment, therefore, the contact members 12 made of a flexible material are provided on the respective upper surfaces 8a of the pair of support bases 8, and the contact surfaces 12a of the pair of contact members 12 are positioned higher than the upper ends of the pair of support portions 8b. Accordingly, when the specimen 11 is placed on the pair of support bases 8, the specimen 11 does not contact the pair of support portions 8b, but contacts the contact surfaces 12a of the pair of contact members 12 and is supported by the contact surfaces 12a. This configuration can prevent the lower surface side of the specimen 11 from contacting the pair of support portions 8b and being damaged when the specimen 11 is placed. This, in turn, minimizes a change in the strength of the specimen 11.

Figure 5:
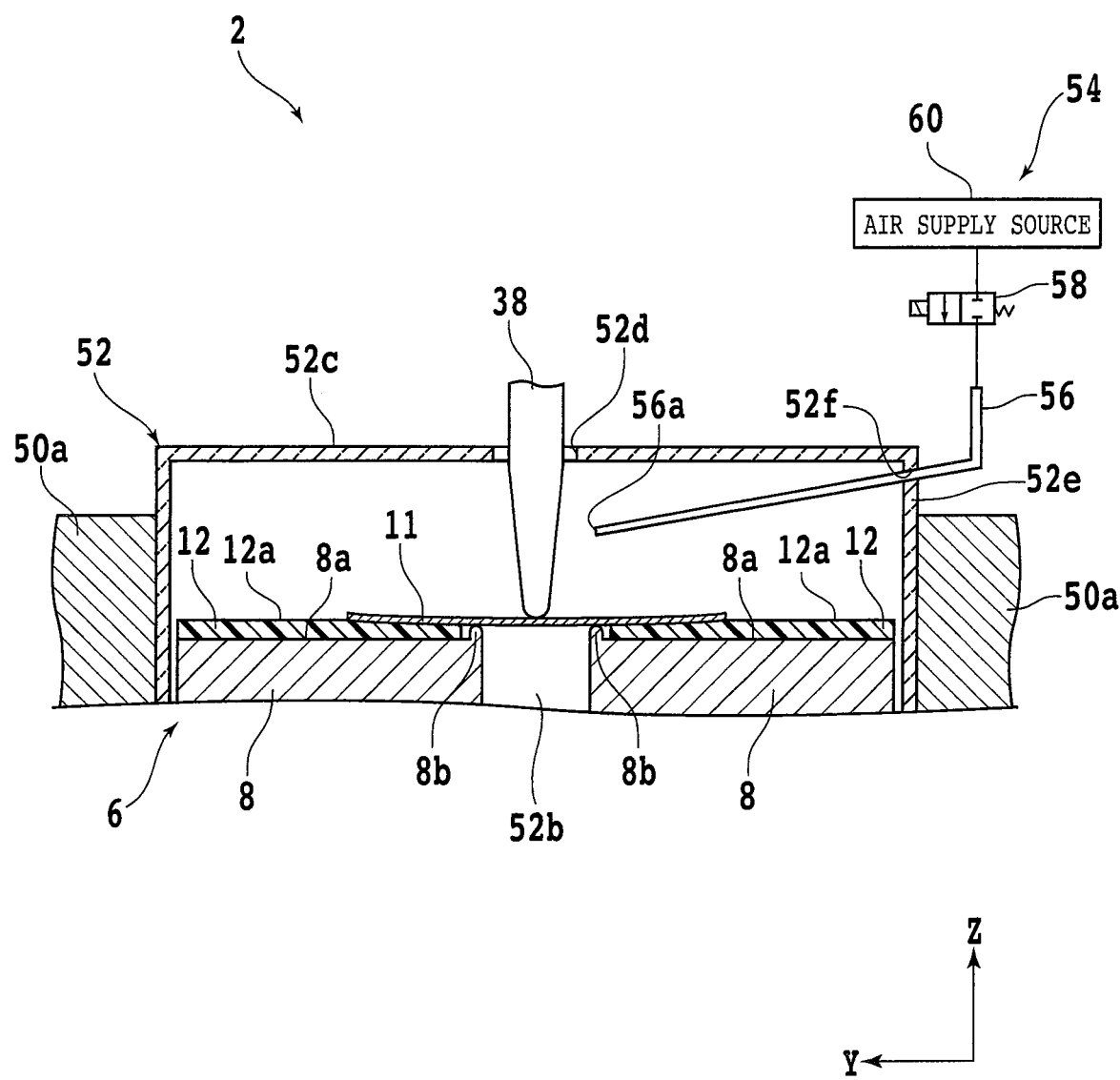
FIG. 5 is a cross-sectional view of the test apparatus with the specimen contacting support portions of a pair of support bases.

Next, the pressing unit 26 is lowered by the movement mechanism 40 (see FIG. 3). When the pressing unit 26 is lowered, the tip of the indenter 38 contacts an upper surface side of the specimen 11 and the specimen 11 is pressed by the indenter 38. The load measurement unit 32 (see FIG. 3) measures the load (force in the Z-axis direction) applied to the indenter 38 pressing the specimen 11. When the pressing unit 26 is further lowered, the specimen 11 is further pressed by the indenter 38. Accordingly, the pair of contact members 12 supporting the specimen 11 is deformed and the specimen 11 is bent. As a result, the lower surface side of the specimen 11 contacts the support portions 8b of the pair of support bases 8. At this time, the pair of contact members 12 may be deformed but the specimen 11 may not be bent depending on the flexibility of the pair of contact members 12. FIG. 5 is a cross-sectional view of the test apparatus 2 with the specimen 11 contacting the support portions 8b of the pair of support bases 8. Specifically, when the specimen 11 contacts the pair of support portions 8b, the specimen 11 is supported by the pair of support portions 8b, and the load applied to the indenter 38 pressing the specimen 11 increases.

Figure 6:
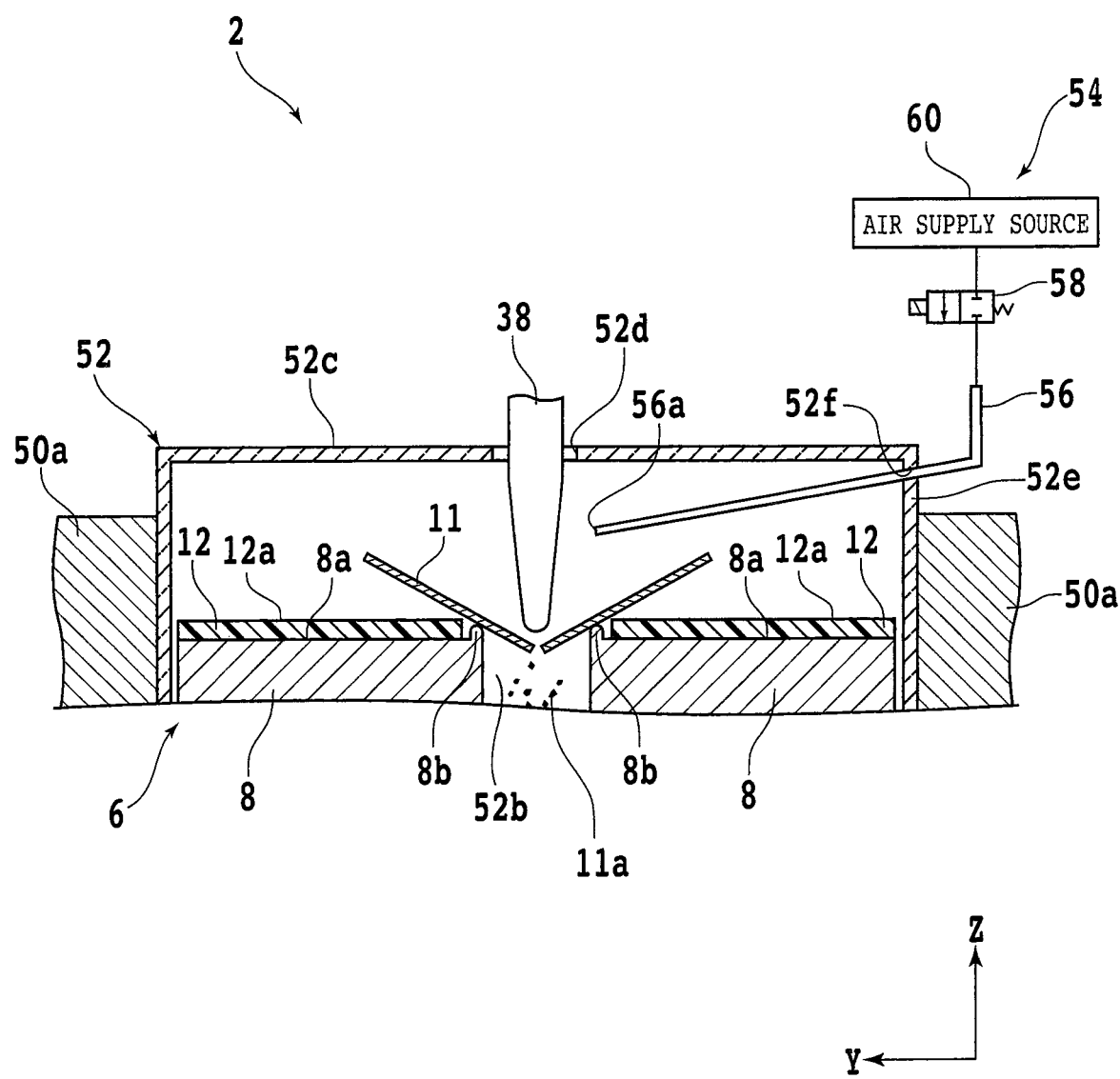
FIG. 6 is a cross-sectional view of the test apparatus with the specimen broken.

When the pressing unit 26 is further lowered, the specimen 11 supported by the pair of support portions 8b is further pressed by the indenter 38. Consequently, the specimen 11 is bent. When the pressing force applied from the indenter 38 to the specimen 11 exceeds a predetermined value, the specimen 11 is broken. FIG. 6 is a cross-sectional view of the test apparatus 2 with the specimen 11 broken. When the specimen 11 is broken, the load measured by the load measurement unit 32 decreases to zero from the maximum value. Accordingly, the timing at which the specimen 11 is broken can be detected on the basis of the change in the value of the load measured by the load measurement unit 32. The maximum value of the load measured by the load measurement unit 32 corresponds to the strength of the specimen 11. Specifically, the bending stress of the specimen 11 is calculated on the basis of the maximum value of the load applied to the indenter 38, the distance between the upper ends of the pair of support portions 8b, and the dimensions of the specimen 11. The bending stress σ of the specimen 11 is represented by $\sigma = 3WL/2bh^2$, where W [N] represents the maximum value of the load applied to the indenter 38 pressing the specimen 11, L [mm] represents the distance between the upper ends of the pair of support portions 8b, b [mm] represents the width of the specimen 11 (the length of the specimen 11 in the direction (X-axis direction) perpendicular to a straight line connecting the pair of support portions 8b), and h [mm] represents the thickness of the specimen 11.

When the specimen 11 is broken, fragments 11a of the specimen 11 are scattered. When the specimen 11 is pressed by the indenter 38, the upper container 52 is positioned so as to cover the specimen 11 and the upper side of the support unit 6 as illustrated in FIG. 6. Therefore, the upper container 52 positioned in this manner prevents the fragments 11a of the specimen 11 from scattering outside the test apparatus 2. As described above, since the upper container 52 prevents the fragments 11a from scattering outside the test apparatus 2, the operator of the test apparatus 2 does not need to wear a protector such as goggles when testing the strength of the specimen 11. This, in turn, prevents a reduction in visibility of the specimen 11 and the components (such as the indenter 38) of the test apparatus 2 due to wearing of the protector.

When the specimen 11 is pressed by the indenter 38, foreign matter (such as the fragments 11a of the specimen 11) may adhere to the indenter 38. Since the foreign matter may affect the accuracy of the test, it is preferable to remove the foreign matter. Therefore, after the specimen 11 is tested, the air supply unit 54 preferably blows air toward the indenter 38 to remove the foreign matter adhering to the indenter 38. Specifically, after the valve 58 of the air supply unit 54 is opened, the air supplied from the air supply source 60 is blown from the tip 56a of the nozzle 56 toward the side surface of the tip portion of the indenter 38. Consequently, the foreign matter adhering to the tip portion of the indenter 38 is blown off and removed. There is no limitation to the timing of removing the foreign matter using the air supply unit 54. For example, the foreign matter may be removed, as necessary, during the time between after one specimen 11 is tested and before the next specimen 11 is tested. The air blown toward the tip portion of the indenter 38 flows inside the upper container 52 and is also blown to the pair of support bases 8. As a result, the foreign matter (such as the fragments 11a of the specimen 11) adhering to the pair of support portions 8b and the contact surfaces 12a of the pair of contact members 12 is blown off and removed by the air. This configuration can, therefore, prevent the foreign matter from contacting the lower surface side of the specimen 11 and damaging the specimen 11 in the next test.

If the tip 56a of the nozzle 56 is directed toward the upper surfaces 8a of the pair of support bases 8, the air blown from the nozzle 56 is strongly blown to the upper surface 8a sides of the pair of support bases 8. In this case, the foreign matter adhering to the pair of support portions 8b or the pair of contact members 12 may be blown off by the air and stir up inside the upper container 52. After that, the foreign matter may adhere to the pair of support portions 8b or the pair of contact members 12 again. With this configuration, it is less likely that the foreign matter is appropriately removed from the upper surface 8a sides of the pair of support bases 8. By contrast, in the test apparatus 2 according to the present embodiment, the tip 56a of the nozzle 56 opens toward the side surface of the tip portion of the indenter 38. Consequently, the momentum of air blown to the upper surface 8a sides of the pair of support bases 8 is moderately weakened. With this configuration, the foreign matter is appropriately removed from the upper surface 8a sides of the pair of support bases 8.

Repeatedly testing the specimen 11 and removing the foreign matter using the air supply unit 54 accumulates the fragments 11a of the specimen 11 in the lower container 4. In the present embodiment, therefore, the fragment discharge unit 62 (see FIG. 1) collects the fragments 11a accumulated in the lower container 4. Specifically, after the valve 66 of the fragment discharge unit 62 is opened, the fragments 11a accumulated in the opening 4b are sucked from the fragment discharge port 4d provided at the bottom of the opening 4b of the lower container 4. The sucked fragments 11a pass through the fragment discharge path 64 and are collected by the fragment collector 70. In this manner, the fragment discharge unit 62 can quickly remove the fragments 11a and eliminate the need to manually clean the inside of the opening 4b of the lower container 4. In the test apparatus 2, the upper container 52 is smaller than the opening 4b of the lower container 4 and has the indenter insertion hole 52d into which the indenter 38 is inserted. Therefore, even when the upper container 52 is lowered toward the lower container 4, the upper container 52 does not seal the opening 4b of the lower container 4. With this configuration, when the fragments 11a of the specimen 11 are sucked from the fragment discharge port 4d, outside air can be easily taken in to the opening 4b and the fragments 11a of the specimen 11 can be smoothly sucked.

In the test apparatus 2 according to the present embodiment, when the specimen 11 supported by the support unit 6 is pressed by the indenter 38, the upper container 52 is positioned so as to cover the specimen 11. Therefore, the upper container 52 positioned in this manner prevents the fragments 11a of the specimen 11 from scattering outside the test apparatus 2 when the specimen 11 is pressed and broken by the indenter 38. As described above, since the upper container 52 prevents the fragments 11a from scattering outside the test apparatus 2, the operator of the test apparatus 2 does not need to wear a protector such as goggles when testing the strength of the specimen 11. This, in turn, prevents a reduction in visibility of the specimen 11 and the components (such as the indenter 38) of the test apparatus 2 due to wearing of the protector, and facilitates the strength test of the specimen 11.

In the example described above, the test apparatus 2 performs the three-point bending test to measure the strength of the specimen 11. However, the contents of the test to be performed by the test apparatus 2 can be changed as appropriate. For example, the test apparatus 2 may perform a ball flexural test or a four-point bending test to test the strength of the specimen 11. When the test apparatus 2 performs the ball flexural test, the test apparatus 2 includes a spherical indenter that presses the specimen 11. Bringing the indenter into contact with a predetermined point of the specimen 11 presses the specimen 11. When the test apparatus 2 performs the four-point bending test, the test apparatus 2 includes a pair of indenters provided parallel to the pair of support portions 8b (see FIG. 2). Bringing the pair of indenters into contact with a predetermined region of the specimen 11 presses the specimen 11. In either of the ball flexural test and the four-point bending test, when the indenter(s) press(es) the specimen 11, the upper container 52 of the test apparatus 2 is positioned so as to cover the specimen 11. This prevents the fragments 11a from scattering outside the test apparatus 2 when the specimen 11 is broken.

The structure, the methods, and the like according to the above-described embodiment can be changed and implemented as appropriate without departing from the scope of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A test apparatus for measuring strength of a specimen, the test apparatus comprising:
    a lower container having an opening that opens upward;
    an upper container having an opening that opens downward and being sized to be insertable into the opening of the lower container;

a support unit that is provided in the opening of the lower container and supports the specimen;

a pressing unit including
  an indenter that presses the specimen, and
  a load measurement unit that measures a load applied to the indenter; and a movement mechanism that moves the indenter closer and away relative to the support unit, wherein when the specimen supported by the support unit is pressed by the indenter moved by the movement mechanism, the upper container is positioned so as to cover the specimen.

2. The test apparatus according to claim 1, further comprising:
  a fragment discharge path having one end that is coupled to a fragment discharge port formed at a bottom of the lower container and having another end that is coupled to a suction source; and
  a fragment collector that is provided in the fragment discharge path and collects a fragment of the specimen.

3. The test apparatus according to claim 1, further comprising:
  a nozzle that blows air toward the indenter.

4. The test apparatus according to claim 1, wherein
the support unit includes
  a pair of support portions that is spaced apart from each other and supports a lower surface side of the specimen, and
  a pair of contact members each provided on either side of the pair of support portions and each having a contact surface that contacts and supports the specimen, each of the pair of contact members is provided such that the contact surface is positioned higher than upper ends of the pair of support portions, the indenter is positioned above the pair of support portions so as to overlap with a region between the pair of support portions, and when the specimen is pressed by the indenter, the specimen is supported by the pair of support portions.

* * * * *